(12) United States Patent
Ireland

(10) Patent No.: US 12,556,468 B2
(45) Date of Patent: Feb. 17, 2026

(54) QUALITY TESTING OF COMMUNICATIONS FOR CONFERENCE CALL ENDPOINTS

(71) Applicant: T-MOBILE INNOVATIONS LLC, Overland Park, KS (US)

(72) Inventor: Kelley W. Ireland, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 290 days.

(21) Appl. No.: 18/163,371

(22) Filed: Feb. 2, 2023

(65) Prior Publication Data

US 2024/0267309 A1    Aug. 8, 2024

(51) Int. Cl.
*H04L 43/08* (2022.01)
*H04L 43/10* (2022.01)

(52) U.S. Cl.
CPC .............. *H04L 43/08* (2013.01); *H04L 43/10* (2013.01)

(58) Field of Classification Search
CPC ................................ H04L 43/08; H04L 43/10
USPC ........... 348/14.08, 14.01, 14.02, 14.07, 14.1, 348/14.12
See application file for complete search history.

(56) References Cited

U.S. PATENT DOCUMENTS

| | | | |
|---|---|---|---|
| 7,869,377 B2 | 1/2011 | Clark | |
| 7,936,916 B2 | 5/2011 | Zhang et al. | |
| 8,174,558 B2 | 5/2012 | Smith et al. | |
| 8,670,336 B2 | 3/2014 | Velenko et al. | |
| 8,861,701 B2 | 10/2014 | Abuan et al. | |
| 9,380,297 B1 | 6/2016 | Djurdjevic | |
| 9,558,451 B2 | 1/2017 | Nilsson et al. | |
| 10,171,514 B2 | 1/2019 | Ramachandran et al. | |
| 11,202,240 B2* | 12/2021 | Raheem | H04L 41/40 |
| 2016/0205397 A1* | 7/2016 | Martin | H04N 17/04 348/192 |
| 2017/0104647 A1* | 4/2017 | Chaiyochlarb | H04L 43/55 |
| 2018/0034887 A1* | 2/2018 | Dunne | H04L 43/16 |
| 2019/0068389 A1* | 2/2019 | Chitre | H04L 12/1863 |
| 2023/0412456 A1* | 12/2023 | Fu | H04L 41/5051 |

\* cited by examiner

*Primary Examiner* — Duc Nguyen
*Assistant Examiner* — Carissa A Jones

(57) ABSTRACT

Systems, methods, and devices are disclosed herein for testing the quality of communications from an endpoint to other endpoints associated with a conference call. In an implementation, the endpoint sends a request to the other endpoints associated with a conference call to test the quality of communications from the endpoint. The endpoint receives replies to the request from the other endpoints, each of which indicates a mean opinion score determined by a respective endpoint in response to the request. The endpoint determines an overall quality of communication originating from the endpoint based on the mean opinion scores. The endpoint displays an indication of the overall quality of the communication originating from the endpoint in a user interface of the endpoint.

20 Claims, 8 Drawing Sheets

QUALITY TESTING OF COMMUNICATIONS FOR CONFERENCE CALL ENDPOINTS

TECHNICAL FIELD

Aspects of the disclosure are related to the field of telecommunications, particularly communication quality testing.

BACKGROUND

Telecommunication services, such as voice-over-IP (VOIP) calling and videoconferencing, provide real-time audio and video communication between multiple users, the communication comprising information packets traveling between users along an end-to-end network communication path. Because the communication path transits multiple wired and wireless networks, network infrastructure, network traffic congestion, network latency, and other performance-related factors of the networks can introduce transmission errors in the communication which will accumulate along the communication path. This accumulation of transmission errors degrades the quality of the communication. Telecommunication services are particularly sensitive to transmission errors such as latency, jitter, and packet loss which can have a severe impact on the quality of the user experience.

Historically, in telephony, the quality of voice communication as perceived or understood by humans was quantified by a mean opinion score (MOS). A mean opinion score is an average of individual subjective scores ranging from 1 (bad) to 5 (excellent) with respect to the quality of the communication, with an MOS of 4.3-4.5 generally considered excellent. Since then, the mean opinion score has been adapted for use with audio and video communications as a service quality metric. However, because the MOS reflects the quality of communication at the point where a signal or communication is received, it is of limited utility in diagnosing where and when signal degradation may be occurring along the network communication path, which can be anywhere from the point of transmission to the point of reception.

TECHNICAL OVERVIEW

Systems, methods, and devices are disclosed herein to test the quality of communications from an endpoint to other endpoints associated with a conference call. In an implementation, the endpoint sends a request to the other endpoints associated with a conference call to test the quality of communications from the endpoint. The endpoint receives replies to the request from the other endpoints, each of which indicates a mean opinion score determined by a respective endpoint in response to the request. The endpoint determines an overall quality of communication originating from the endpoint based on one or more of the mean opinion scores. The endpoint displays an indication of the overall quality of the communication originating from the endpoint in a user interface of the endpoint.

In an implementation, the endpoint sends the request at the beginning of the conference call. In some implementations, the endpoint sends the request during the call. The request may comprise a sample of audio and video data, and in some implementations, the sample of audio and video data comprise conference call data.

DETAILED DESCRIPTION

Figure 1:
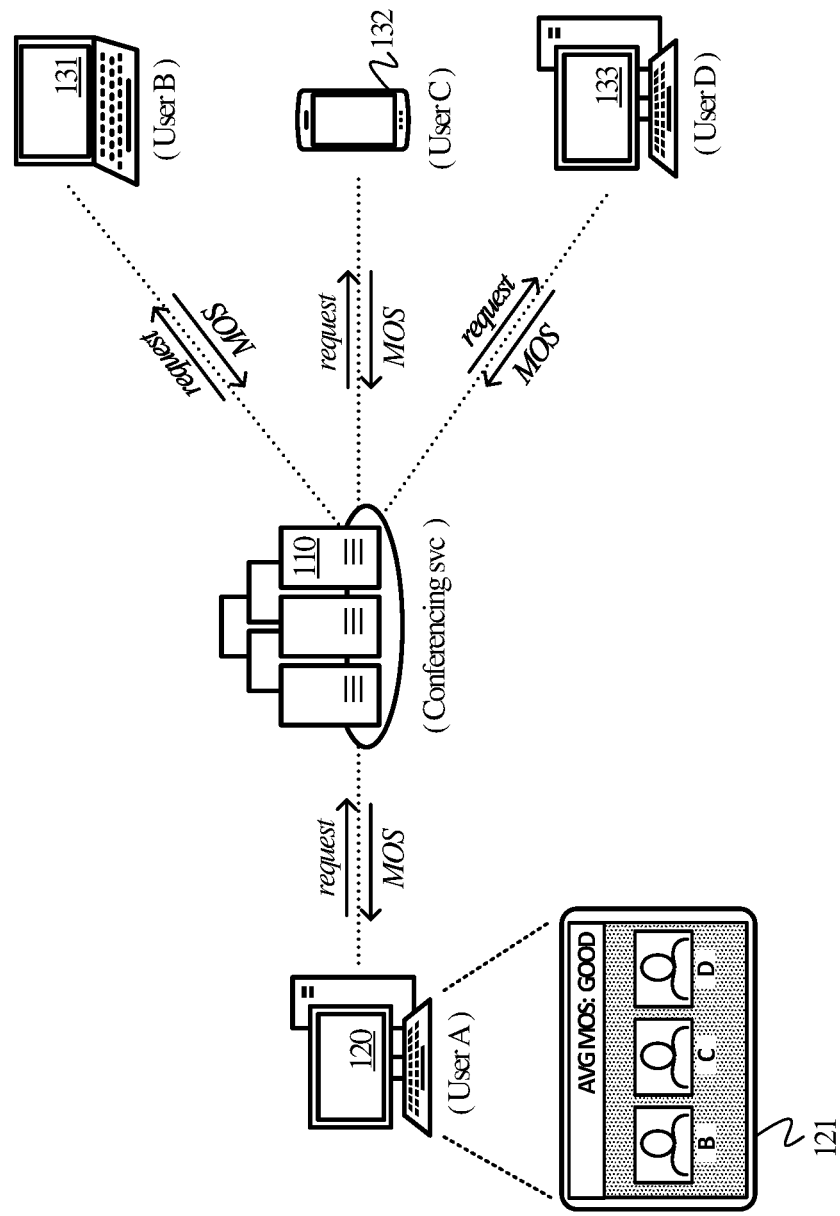
FIG. 1 illustrates an operational environment for a conference call hosted by a conferencing service in an implementation.

Systems, methods, and devices are disclosed herein to test the quality of communications originating from an endpoint to other endpoints associated with a conference call. In an exemplary scenario, a user at a first endpoint participating on a videoconference call may receive satisfactory audio and video from other users on the call but be unaware that the other users are receiving low-quality communication from his or her own computing device. In an implementation of the technology disclosed herein, the first endpoint tests the quality of communication originating from the endpoint by sending a request to the other endpoints. The first endpoint receives responses from the other endpoints on the call, with each response providing a mean opinion score (MOS) for the respective responding endpoint. The first endpoint determines an overall quality of communication originating from that endpoint and displays an indication of the quality in a user interface of the endpoint. Thus, the user at the first endpoint can monitor the quality of communications originating from his or her device and be alerted to problems other endpoints may have in receiving those communications. In a conference call, any of the endpoints may be a first endpoint for the purpose of testing the quality of communications originating from that endpoint.

In various implementations, a user at the first endpoint may initiate the communication quality test by the endpoint at various times during the conference call, such as at the start of the call or during the call. Alternatively, the first endpoint may automatically perform a communication quality test at various times during the call, such as at the start of the call or periodically during the call. In still other implementations, the first endpoint may initiate a communication quality test if the endpoint detects a possible issue relating to its network connectivity.

In an implementation of a test of communication quality, the first endpoint sends a request to the other endpoints on the conference call which includes a sample or snippet of background audio and/or video data from the conference call. The other endpoints receive and score the quality of the audio or video by determining an MOS of the audio and/or video. In some implementations, the sample of audio and video data in the request is a snippet of actual conference communication data transmitted from the first endpoint, such as a portion which includes a user on the call speaking. The request may include a ping or timing signal by which latency in communication between the first endpoint and a responding endpoint can be measured. For a voice-only conference call, the request may include audio data only.

Upon receiving the request from the first endpoint, each of the other endpoints on the conference call determines mean opinion scores of the audio and video quality of the sample communication of or in the request. In various implementations, a responding endpoint objectively determines mean opinion scores of the audio and video of the sample communication using an MOS algorithm or model, such as a machine learning model. An MOS model may be trained using subjective MOS datasets to provide an objective mean opinion score or an estimation of a subjective MOS indicative of the quality of the sample communication. Algorithmic MOS models may use measures such as latency, noise, echo, and distortion, as well as packet-related statistics, in computing mean opinion scores of the sample communication received from the first endpoint.

When the responding endpoints transmit their mean opinion scores (and, in some implementations, other response data) to the first endpoint, the first endpoint uses the data to determine an overall quality of communication originating from that endpoint. The overall quality of communication may be a statistical average of the mean opinion scores received from the other endpoints (e.g., a mean of the mean opinion scores received). In some implementations, the overall quality includes averages computed for the audio and video components. The overall quality may also include a single metric based on both the audio and video mean opinion scores. In computing a statistical average, the first endpoint may for large datasets, compute an average for a trimmed dataset, that is, a dataset which excludes outlier scores. The first endpoint also may exclude data received from an endpoint for other reasons, such as an indication that the data may be unreliable for reasons unrelated to the first endpoint.

In some implementations, in addition to audio and video mean opinion scores and latency measurements, the response data from a responding endpoint may also include data which indicates how well the responding endpoint is receiving communications from other endpoints on the conference call. The first endpoint may exclude on an empirical basis data from a responding endpoint where the response data indicates that the responding endpoint is experiencing issues or difficulties receiving transmissions from multiple other endpoints and not just the first endpoint. For example, if a responding endpoint is a mobile device in a location with poor signal quality (e.g., due to high network traffic), the response data may indicate that the endpoint is having signal reception issues for communications from all endpoints on the conference call. The response data of the endpoint with poor signal quality may therefore be excluded as unreliable with respect to the quality of the first endpoint's communications.

For endpoints accessing a videoconference or conference call via a fifth-generation (5G) communication network, response data sent to the first endpoint from the other endpoints may include network slice data or Quality of Service (QoS) data for those endpoints. A network slice is a virtual or logical network, operating over a physical network, which is tailored to a particular type of use. Network slice data of a given endpoint includes attributes relating to the allocation of network resources, services, and capabilities for delivering telecommunication services to the given endpoint. Network slice or QoS attributes include data speed, quality, throughput, latency, reliability, mobility, and security. The first endpoint may use the network slice data of the responding endpoint to identify the source of issues impacting the quality of communications received by a responding endpoint. In other words, the first endpoint may use network slice data of the responding endpoint to exclude as flawed any mean opinion scores from that endpoint in assessing the quality of its own transmissions. In an exemplary scenario, a responding endpoint may calculate a low mean opinion score for a sample communication originating from the first endpoint. With the network slice data of the responding endpoint, the first endpoint may determine that the problems experienced at or by the responding endpoint originate not with the first endpoint, but instead with how network resources have been allocated to the responding endpoint. Thus, response data from a responding endpoint with, say, limited bandwidth would be excluded by the first endpoint on an empirical basis as unreliable with respect to assessing the quality of the first endpoint's transmissions.

In an implementation, when the first endpoint initiates a test of communication quality, the cloud service hosting the conference call or videoconference may receive mean opinion scores and/or other response data from the endpoints, determine the overall quality of communication for the first endpoint, and transmit an indication of the overall quality to the endpoint for display in the user interface. In still other implementations, the cloud service may prompt an endpoint to initiate a test, for example, if the cloud service detects an issue with network connectivity to the endpoint. By collecting response data as tests are performed by various endpoints during the call, the cloud service can monitor communication quality with respect to all the endpoints of the conference call and alert an endpoint when it detects an issue with communications originating from that endpoint.

Turning now to the Figures, FIG. 1 illustrates an operational environment 100 for testing communication quality by an endpoint during a conference call in an implementation. Operational environment 100 includes conferencing service 110 hosting a conference call or videoconference amongst users at endpoints 120, 131, 132, and 133. Endpoint 120 displays user interface 121 of a conferencing application executing on endpoint 120.

Figure 7:
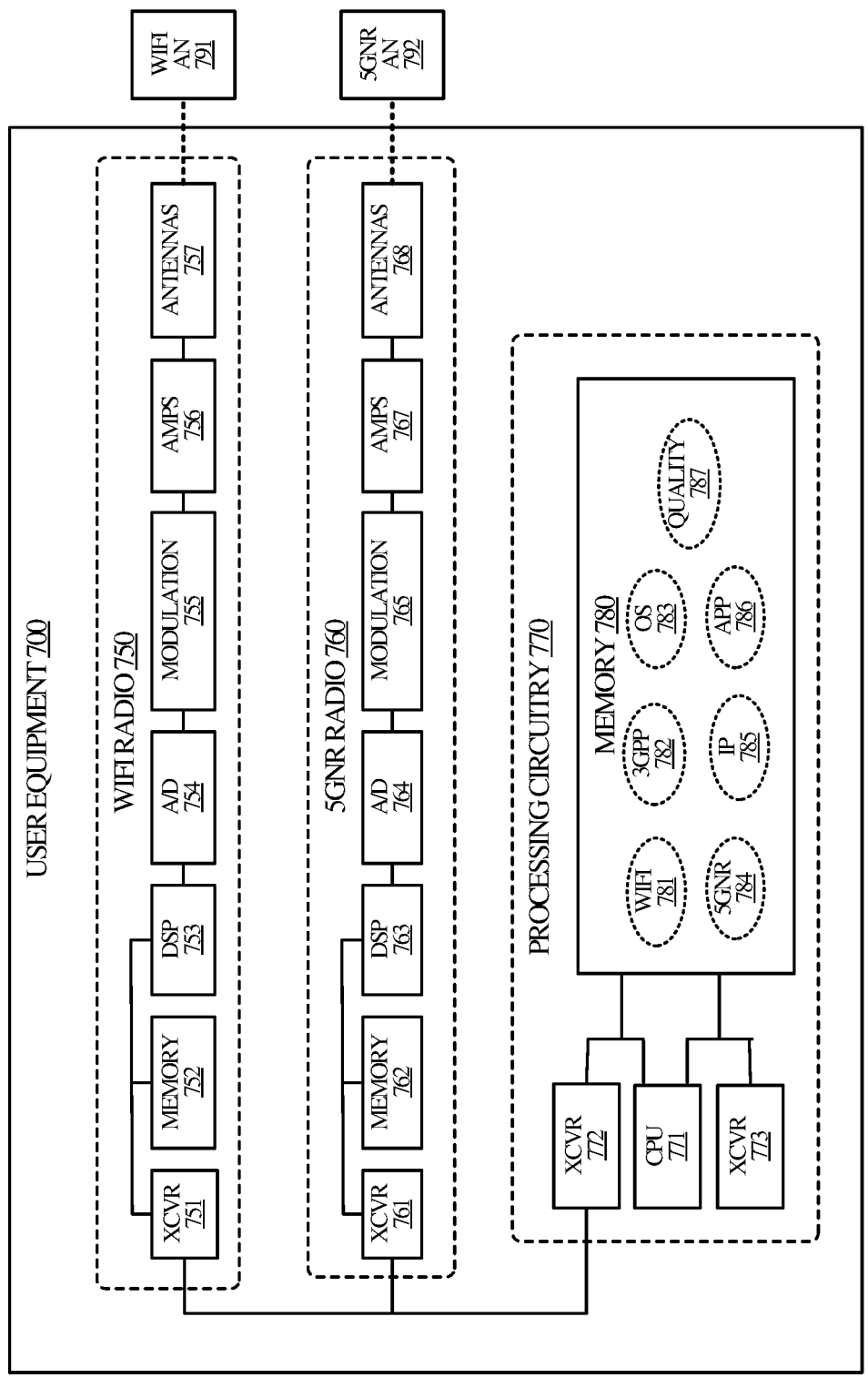
FIG. 7 illustrates a wireless computing device suitable for implementing the various operational environments, architectures, processes, scenarios, and sequences discussed below with respect to the other Figures.

Endpoints 120, 131, 132, and 133 are representative of computing devices, such as laptops or desktop computers, or mobile computing devices, such as tablet computers or cellular phones, with processing circuitry for network communication with conferencing service 110 over one or more wired or wireless communication networks. Endpoints 120, 131, 132, and 133 are also representative of wireless communication devices or radios which wirelessly communicate using protocols such as Fifth Generation New Radio (5GNR), 5G Advanced, LTE, Institute of Electrical and Electronic Engineers (IEEE) 802.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA). Each of endpoints 120, 131, 132, and 133 is implemented on a suitable computing device, of which computing device 800 of FIG. 8 or a 5G-enabled computing device of which user equipment (UE) 700 of FIG. 7 is representative.

Each of endpoints 120, 131, 132, and 133 executes a client communication application for videoconferencing. The communication application displays user interface 121 on the endpoint and communicates with conferencing service 110, such as sending user input from user interface 121 to conferencing service 110. Endpoints communicate with conferencing service 110 via one or more internets and intranets, the Internet, wired and wireless networks, local area networks (LANs), wide area networks (WANs), and any other type of network or combination thereof.

User interfaces of endpoints 120, 131, 132, and 133 enable their respective users to exchange audio and video communication with other users, i.e., to facilitate bidirectional communication, in the context of a conference call, videoconference, or other online collaboration session. The user interfaces can include graphical representations of user input devices such as buttons, text boxes, and sliders by which a user can control the transmission of his or her live video and/or audio feed.

Conferencing service 110 is representative of one or more computing services capable of interfacing with computing devices such as endpoints 120, 131, 132, and 133. Conferencing service 110 comprises services capable of interfacing with endpoints 120, 131, 132, and 133 over one or more wired or wireless communication networks and includes various processes or subservices for hosting conference calls, videoconferences, or collaboration sessions with two-way communications among two or more users.

In operation, conferencing service 110 hosts a conference call between users at endpoints 120, 131, 132, and 133. (While operational environment 100 illustrates four endpoints, it may be appreciated that the conference call can be hosted amongst any number of endpoints.) In the conference call, there is bidirectional audio and video transmission for communication between all endpoints. A user at endpoint 120 is able to communicate with, for example, users at endpoints 131, 132, and 133 via user interface 121 displayed on endpoint 120. Similarly, the users at endpoints 131, 132, and 133 participate in the conference call via user interfaces (not shown) of the communication applications executing on those endpoints.

Endpoint 120 performs a test of communication quality by sending a request, via conferencing service 110, to endpoints 131, 132, and 133. The request contains a communication sample (i.e., a sample of communication data), such as background communication data of the conference call or actual communication data of the conference call.

Each of endpoints 131, 132, and 133 receives the request from endpoint 120 and determines a mean opinion score for the communication sample which is indicative of the quality of the audio and video of communication originating from endpoint 120. Endpoints 131, 132, and 133 remit their respective mean opinion scores to endpoint 120 via conferencing service 110.

When endpoint 120 receives the mean opinion scores generated by endpoints 131, 132, and 133, endpoint 120 determines an overall quality of communication based on the mean opinion scores. Endpoint 120 then displays in user interface 121 an indication of the overall quality of communication from the endpoint for the benefit of the user.

Figure 2:
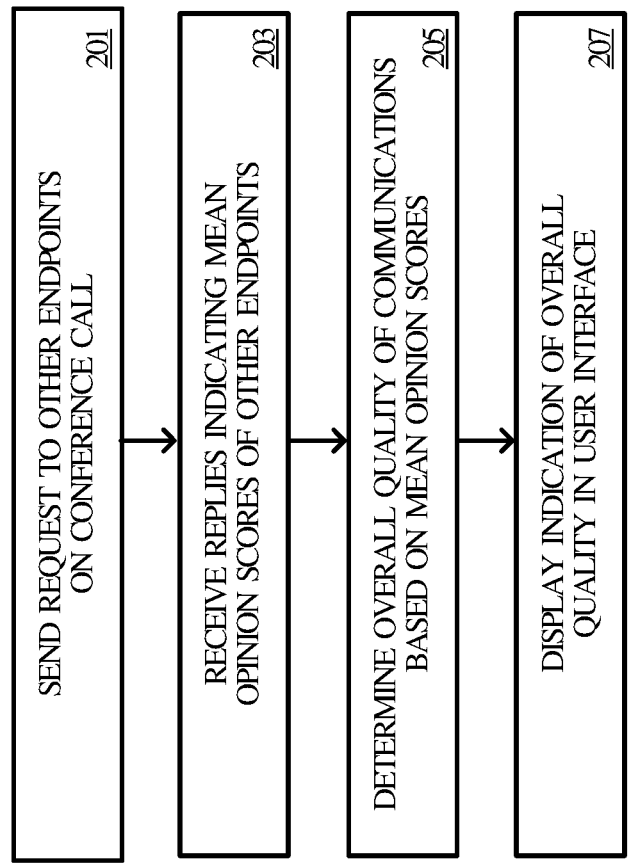
FIG. 2 illustrates an exemplary operation of an endpoint of a conference call in an implementation.

FIG. 2 illustrates process 200 performed by an endpoint, such as endpoint 120 of FIG. 1, to test the quality of communications originating from the endpoint. The process executes on a computing device of endpoint 120 according to program instructions which direct the computing device to function as follows, referring parenthetically to the steps in FIG. 2 and in the singular for the sake of clarity.

In process 200, a user device, such as a smartphone or other communication device, connects to and participates in a conference call with other endpoints. The user device may participate in the conference call via a conferencing application such as Microsoft Teams®, Google Meet®, Zoom®, Webex®, and the like. At some point during the call, the endpoint sends to the other endpoints a request to test the quality of communications originating from the endpoint (step 201). The request can include a sample of communication data, such as a snippet of background audio and video from the conference call or a snippet of actual communication data from the conference call, such as a brief clip of the user at the endpoint speaking to the other users. The endpoint receives replies from the other, responding endpoints including mean opinion scores of the audio and video of the communication sample from the endpoint (step 203). In various implementations, the endpoint may also other response data, such as latency measurements and mean opinion scores generated for sample communications from a different endpoint on the call. For responding endpoints with 5GNR connectivity, response data may also include network slice data or QoS data.

Having received responses to the request, the requesting endpoint determines an overall quality of communications originating from the endpoint based at least on the mean opinion scores (step 205). In an implementation, the endpoint determines whether each response is statistically and empirically appropriate to include in the determination of overall quality. For example, the endpoint may discard or exclude outlier scores from responding endpoints, or the endpoint may determine that scores of a responding endpoint are unreliable due to issues occurring at the endpoint or with the endpoint's network connectivity.

When the endpoint determines an overall quality of communications originating from the endpoint, the endpoint displays an indication of the overall quality in the user interface of the device (step 207). For example, the endpoint may display in the user interface of the conferencing application a graphical icon which reflects the overall quality according to a symbol and/or color. In various implementations, the endpoint performs a test at regular intervals during the call and updates the indication in the user interface accordingly. The endpoint may also perform a test if it detects an issue with its own network connectivity or on-demand by the user. In some implementations, if the endpoint determines that communications originating from the endpoint are severely degraded, the endpoint may display a pop-up window to alert the user to the overall quality assessment.

Referring again to FIG. 1, operational environment 100 illustrates a brief example of process 200 as employed by endpoints 120, 131, 132, and 133 of a conference call hosted by conferencing service 110. In operation, endpoint 120 sends a request to endpoints 131, 132, and 133 to test the quality of communications originating from endpoint 120. At endpoint 120, a user interface for conferencing application is displayed including real-time audio and video feeds from the other endpoints. The test evaluates the audio and video transmitted by endpoint 120 and received by the other endpoints on the call and alerts the user at endpoint 120 to any issues or problems with communication transmitted from endpoint 120, i.e., poor quality audio and/or video. Conferencing service 110 hosting the conference call relays the request from endpoint 120 to each of the other endpoints on the call, i.e., endpoints 131, 132, and 133 in this exemplary scenario.

The request from endpoint 120 includes a communication sample with audio and video components. The sample may include a snippet of background audio and video from the conference call, or it may include a snippet of audio and video of the user or speaker speaking at endpoint 120. In an implementation, the sample may include audio and video data configured for testing communication from an endpoint.

Upon receiving the request from endpoint 120, each of endpoints 131, 132, and 133 determines a mean opinion score for the audio and video components of the communication sample and transmits the mean opinion scores to endpoint 120. In an implementation, endpoints 131, 132, and 133 also transmit mean opinion scores or other data relating to communications originating from other endpoints. For example, endpoints 131 and 133 may transmit to endpoint 120 mean opinion scores for communications originating from endpoint 132. In some implementations, any of endpoints 131, 132, and 133 which are connected to a 5G network may transmit its respective network slice data to endpoint 120. The mean opinion scores and other response data are relayed from endpoints 131, 132, and 133 to endpoint 120 via conferencing service 120. In some implementations, communications related to testing communication quality may be relayed between endpoint 120 and another endpoint on the conference call via a peer-to-peer network connection.

Using the mean opinion scores and other response data provided by endpoints 131, 132, and 133, endpoint 120 determines an overall quality of communications originating from endpoint 120. In an implementation, endpoint 120 computes a statistical mean of the mean opinion scores for the audio and video components. In some implementations, endpoint 120 may exclude a mean opinion score on a statistical or empirical basis. For example, for a large population of endpoints, endpoint 120 may compute a trimmed mean, excluding outlier scores or other scores which differ significantly from the other scores when determining the overall quality. Endpoint 120 may also exclude scores which are unreliable indicators of the quality of communications from endpoint 120, such as when a responding endpoint reports low mean opinion scores for communications originating from other endpoints on the call (e.g., the endpoint has an issue with its network connectivity) or when the network slice data or Quality of Service data of an endpoint indicates the endpoint is receiving suboptimal allocation of network resources (e.g., low bandwidth, excessive latency, etc.).

In an implementation, mean opinion scores may be objectively determined scores of audio and video quality which based on algorithms or models which compute a hypothetical or estimated subjective mean opinion score. In an implementation, endpoints 131, 132, and 133 use a machine learning model trained using actual subjective mean opinion score datasets to determine the mean opinion scores. In some implementations, the mean opinion scores received from endpoints 131, 132, and 133 may be values between 1 and 5, and endpoint 120 may categorize the overall quality based on an average of the scores. For example, endpoint 120 may categorize the overall quality as excellent for an average score of 4.3 or greater, good for an average score of 3.5 or greater, or poor for scores below 3.5.

Having determined an overall quality of its audio and video communications, endpoint 120 displays an indication of the overall quality in a user interface of an application executing on the endpoint. To illustrate the benefit of the technology disclosed herein, in an exemplary scenario, the user at endpoint 120 may be receiving satisfactory audio and video from endpoints 131, 132, and 133 but without knowing how his or her own transmissions are being received at the other endpoints. If endpoint 120 determines that the overall quality of communications from endpoint 120 is unsatisfactory, an indication is displayed in the user interface which signals the user at endpoint 120 that the other endpoints are receiving poor quality audio and/or video. This enables the user to take steps to remedy the situation. If, on the other hand, endpoint 120 determines that the overall quality is satisfactory, the user can participate with confidence that his or her communications are being received at the other endpoints without having to query the users about the quality of the transmission.

In various implementations, an endpoint or a user at an endpoint may initiate a test to assess the quality of communications originating from the endpoint. For example, endpoint 120 may initiate a test of audio and video communication at the start of the call or at various times during the call. Endpoint 120 may also initiate a test if it detects that there may be an issue or difficulty with its network connectivity. Alternatively, the user interface displayed on endpoint 120 may display a button or other graphical input device by which the user can trigger a test at the start of the call or during the call.

In other implementations of the disclosed technology, conferencing service 110 analyzes the mean opinion scores of endpoints on a conference call on behalf of the requesting endpoint and transmits the results to the requesting endpoint. For example, for a test of communication quality initiated by endpoint 120, conferencing service 110 gathers mean opinion scores sent by endpoints 131, 132, and 133 in response to the request, determines the overall quality of communications originating from endpoint 120 based on the mean opinion scores, and sends an indication of the overall quality of communications to endpoint 120. In other scenarios, conferencing service 110 may initiate the test, prompting endpoint 120 to transmit the request to the other endpoints on the call. The request may include, in some implementations, audio and/or video data preconfigured for testing. In other implementations, the audio and/or video data is derived or extracted from the communication data of the conference call.

In determining the overall quality of communications for endpoint 120, conferencing service 110, in some implementations, computes an average of the mean opinion scores of the responding endpoints. In computing an average, conferencing service 110 may exclude, in determining the overall quality, mean opinion scores from any of the responding endpoints 131, 132, and 133 on a statistical or empirical basis. For example, conferencing service 110 may receive network slice data or QoS data which indicates that the mean opinion score of a responding endpoint may be affected by issues specific to the endpoint, rendering its mean opinion scores as invalid with respect to the test.

Having received and analyzed mean opinion scores on behalf of endpoint 120, conferencing service 110 may also alert the user at endpoint 120 to the status of transmissions from endpoint 120 by transmitting an indication of the overall quality of communications to endpoint 120 and causing endpoint 120 to display the indication, such as in the user interface of a client conferencing application of conferencing service 110.

Conferencing service 110 may also analyze mean opinion scores for tests performed by endpoints of the conference call on an ongoing basis during the call and, on the basis of that analysis, transmit an indication of communication quality to the endpoints periodically or when an issue in communication quality becomes apparent.

Figure 3:
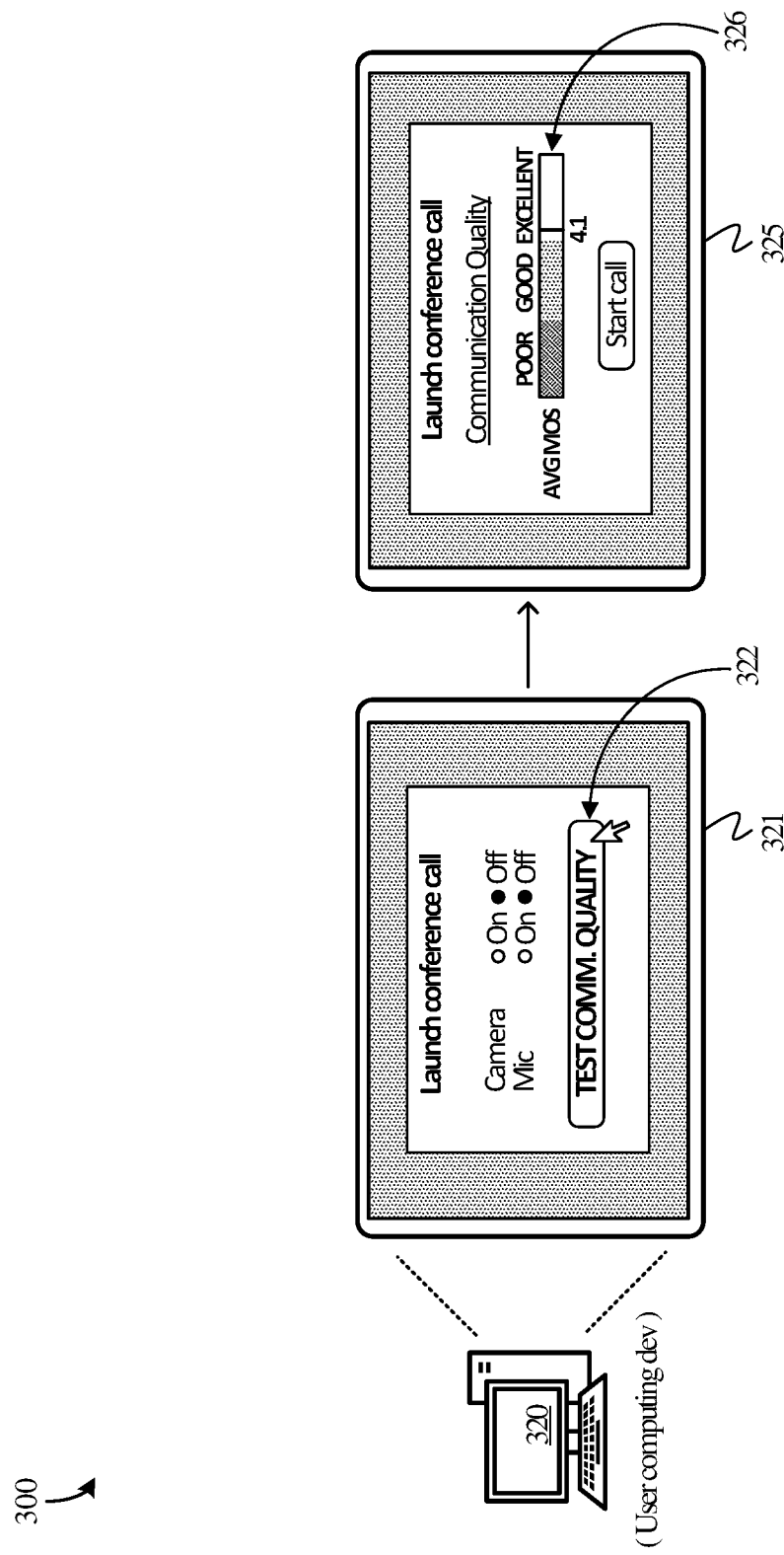
FIG. 3 illustrates an exemplary operation of an endpoint of a conference call in an implementation.

FIG. 3 illustrates an exemplary operational scenario 300 of endpoint 320 at the start of a conference call in an implementation. Endpoint 320, of which endpoint 120 in FIG. 1 is representative, executes a conferencing application by which endpoint 320 can communicate with at least one other endpoint on a conference call. The conferencing application may be a client application of a conferencing service hosted remotely. The conferencing application displays a launch screen in user interface 321 by which the user can start or join a conference call. In user interface 321, the user is presented with the option to test the quality of communications originating from endpoint 320 by clicking on button 322. When endpoint 320 receives user input to perform a test (i.e., when the user clicks button 322), endpoint 320 sends to other endpoints connected to the conference call a communication sample of audio and video data.

Upon receiving the request from endpoint 320, each of the other endpoints determines mean opinion scores for the audio and video components of the communication sample and transmits those scores to endpoint 320. Endpoint 320 computes one or more metrics, such as an average, which is representative of the overall quality of communications originating from endpoint 320 and displays an indication of the overall quality in user interface 325. The indication of overall quality may include an iconic or numeric representation of the overall quality and may be color-coded to facilitate the user's consumption of the information.

In operational scenario 300, user interface 325 displays scale 326 which shows the overall quality determination based on the mean opinion scores received from the other endpoints. Scale 326 provides a visual indication of the overall quality by categorizing the overall quality as excellent, good, and poor and provides an average MOS which, in this example, indicates that the communication quality is excellent. Scale 326 is color-coded according to category for improved readability.

Figure 4:
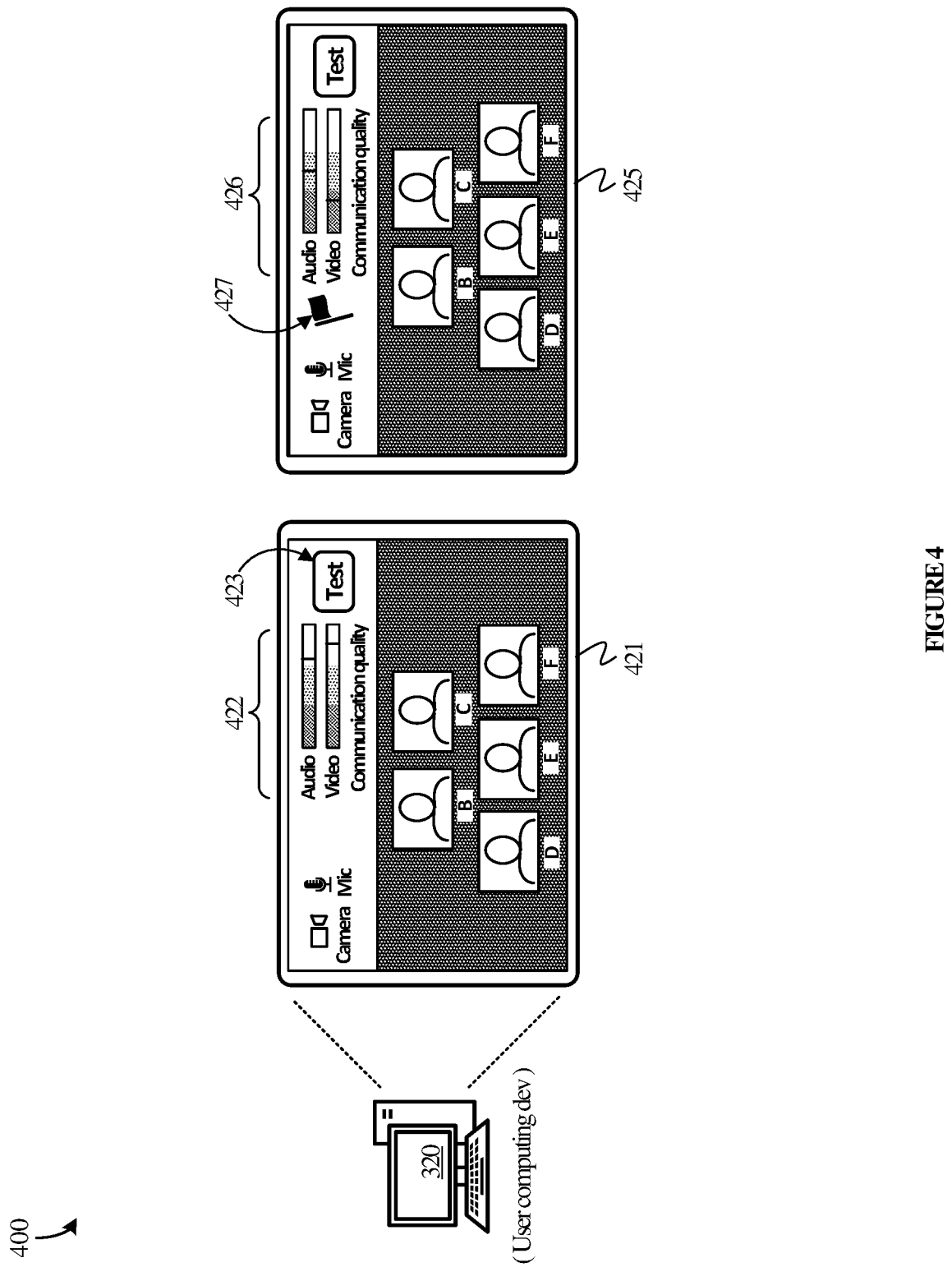
FIG. 4 illustrates an exemplary operation of an endpoint of a conference call in an implementation.

FIG. 4 illustrates exemplary operational scenario 400 of endpoint 320 in an implementation during a conference call. In operational scenario 400, a user at endpoint 320 is participating in a conference call with at least five other users (B, C, D, E, and F). User interface 421 of the conferencing application executing on endpoint 320 displays real-time video and audio received from the other endpoints. Simultaneously, the conferencing application transmits to the other endpoints audio and video of the user at endpoint 320 using a camera and microphone onboard or operatively coupled to endpoint 320.

In user interface 421, indicator 422 displays quality data for the audio and video components of communications originating from endpoint 320 in the form of a color-coded graphical scale. The quality data displayed in indicator 422 is based on the results of a test of the audio and video transmissions performed by endpoint 320. In the exemplary scenario illustrated, audio and video quality have been determined to fall within the highest of three quality categories which are distinguished by color or shading (e.g., excellent of categories poor, good, and excellent). Graphical button 423 presents the user with the option to initiate a test of the quality of communications originating from endpoint 320 during the call.

Continuing the exemplary scenario, in user interface 425, indicator 426 displays quality data for a subsequent test of communication quality, such that the audio and video quality have fallen into lower categories (e.g., good for audio and poor for video). User interface 425 also displays icon 427 to alert the user to the substandard reception of communications by the other endpoints. Notably, although the user may be receiving satisfactory communications from the other endpoints, without indicator 426 or icon 427, the user might otherwise be unaware that video transmissions originating from endpoint 320 have degraded.

Figure 5:
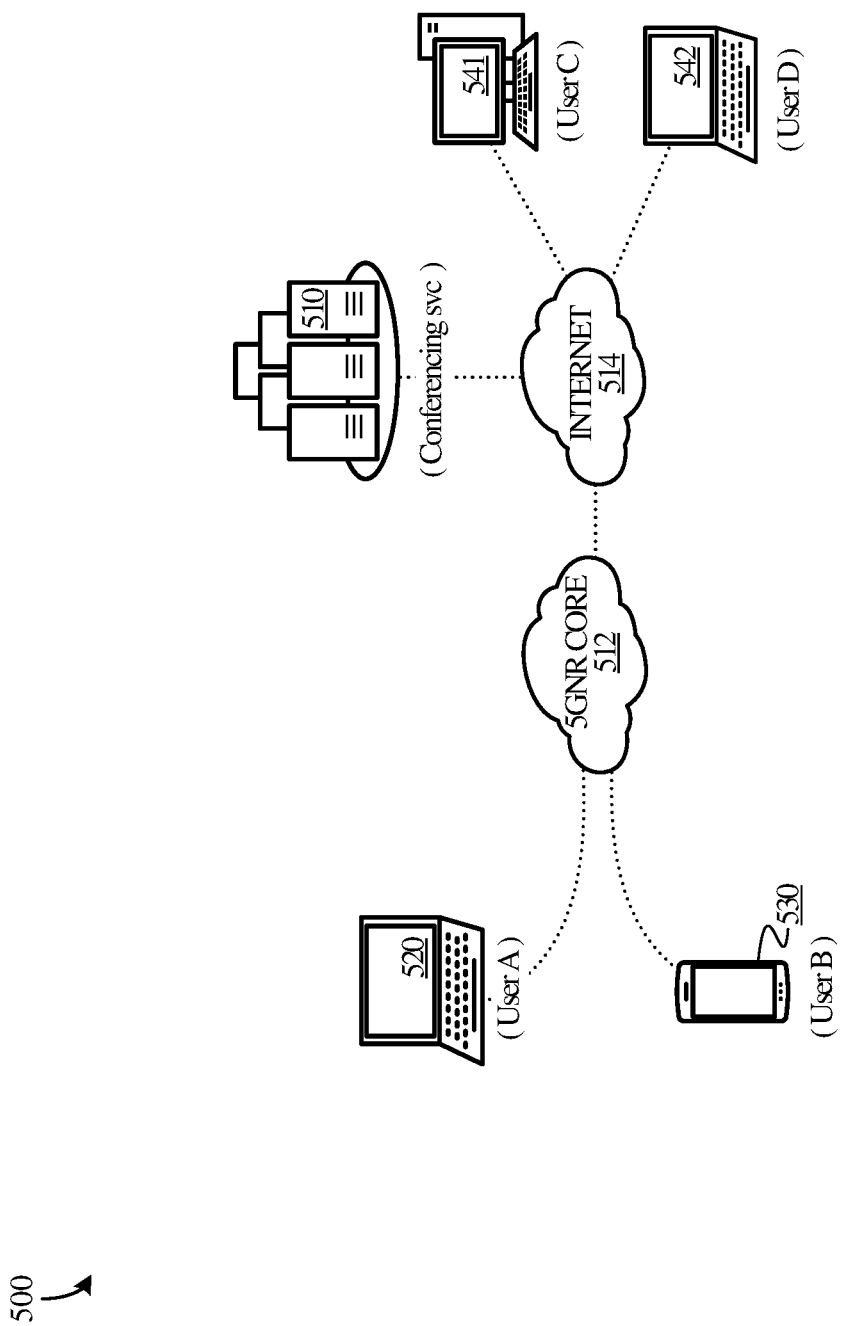
FIG. 5 illustrates an operational environment of a conference call via communication networks in an implementation.

FIG. 5 illustrates operational architecture 500 for testing communication quality from an endpoint during a conference call in which two of the endpoints are 5G-enabled computing devices which connect to the conference call via a 5GNR network in an implementation. In FIG. 5, operational architecture 500 includes endpoints 520 and 530 which connect to a videoconference or conference call hosted by conferencing service 510 via a 5GNR network of 5GNR network core 512. Endpoints 520 and 530 are implemented on 5G-enabled computing devices, of which user equipment (UE) 700 of FIG. 7 is representative. In an implementation, each of endpoints 520 and 530 connect to 5GNR network core 512 via a 5GNR access node, of which 5GNR access node 792 of FIG. 7 is representative. Also in FIG. 5, endpoints 541 and 542 are also logged into the conference call hosted by conferencing service 510 but are connected via Internet access 514.

For example, endpoints 520 and 530 may be mobile computing devices, such as tablet computers or cellular phones, with processing circuitry for network communication with a conferencing service over one or more wired or wireless communication networks using a Fifth Generation New Radio (5GNR) protocol. Endpoints 520 and 530 may also be non-5G-enabled computing devices which connect to conferencing service 510 via a 5G-enabled computing device (e.g., via a Wifi hotspot of a 5G-enabled smartphone).

In an exemplary operational scenario, endpoint 520 sends a request including a sample of communication data, such as background audio and video data extracted from conference call data, to endpoint 530 on the conference call. Upon receiving the request, each of endpoints 530, 541, and 542 determines mean opinion scores for the audio and video components of the sample communication and sends the mean opinions scores to endpoint 520 via conferencing service 510 (or, in some implementations, via a peer-to-peer network connection external to the conference call).

Continuing with the exemplary operational scenario, endpoint 520 also receives from endpoint 530 network slice data for endpoint 530 in response to the request. The network slice data for endpoint 530 includes various attributes relating to the allocation of network resources, services, and capabilities for delivering telecommunication services to endpoint 530. Network slice attributes include data speed, quality, throughput, latency, reliability, mobility, and security. Using the network slice data of endpoint 530, endpoint 520 may determine whether response data from endpoint 530 is relevant to transmission issues which may be occurring at endpoint 520. For example, if endpoint 530 reports receiving substandard communications from endpoint 520, endpoint 520 may determine that the problems experienced at or by endpoint 530 do not originate from endpoint 520 but instead are related to how network resources of 5GNR network core 512 have been allocated to endpoint 530, such as limited bandwidth, longer latency, loss of quality due to compression, etc. Thus, endpoint 520 excludes the scores from endpoint 530 on an empirical basis as unreliable with respect to assessing the quality of the endpoint 520's transmissions during the conference call.

In other implementations, endpoint 520 may receive response data from endpoint 530 which includes mean opinion scores determined by endpoint 530 for tests performed by endpoints 541 and/or 542 during the call. If, for example, endpoint 530 has generated low mean opinion scores for other tests performed by the other endpoints, endpoint 520 may determine, based on the mean opinion scores from the other tests, that the low mean opinion scores from endpoint 530 are not unique to endpoint 520 and therefore are not reliable for assessing the overall quality of communication originating from endpoint 520.

In operation, endpoint 520 accesses a resource such as conferencing service 510 via one or more wired or wireless communication networks including a 5G communication network of 5GNR network core 512. Endpoint 520 communicates with the 5G communication network of 5GNR network core 512 via a 5GNR access node (not shown), of which 5GNR access node 792 of FIG. 7 is exemplary.

Endpoint 520 communicates wirelessly with the 5GNR access node using a 5GNR radio unit, such as 5GNR radio 760 of FIG. 7. The 5GNR radio unit communicates with a distributed unit of the 5GNR access node, in turn, communicates with a centralized unit of the 5GNR access node. The centralized unit communicates the AMF and UPF network functions of 5GNR network core 512. Each of the 5GNR radio unit, distributed unit, and centralized unit include hardware and software components by which to communicate wirelessly with each other and with endpoint 520. Endpoint 520 registers access with the 5GNR access node to access the communication network of 5GNR network core 512.

In various implementations, 5GNR network core 512 includes 5GNR access nodes and network functions such as Interworking Functions (IWFs), Access and Mobility Management Functions (AMFs), Unified Data Managements (UDMs), Policy Control Functions (PCFs), Session Management Functions (SMFs), User Plane Functions (UPFs), Policy Application Function (PAF), and Application Server (AS). The IWFs can include non-3GPP IWFs (N3IWFs) for providing untrusted non-3GPP access to the respective communication networks.

Figure 6:
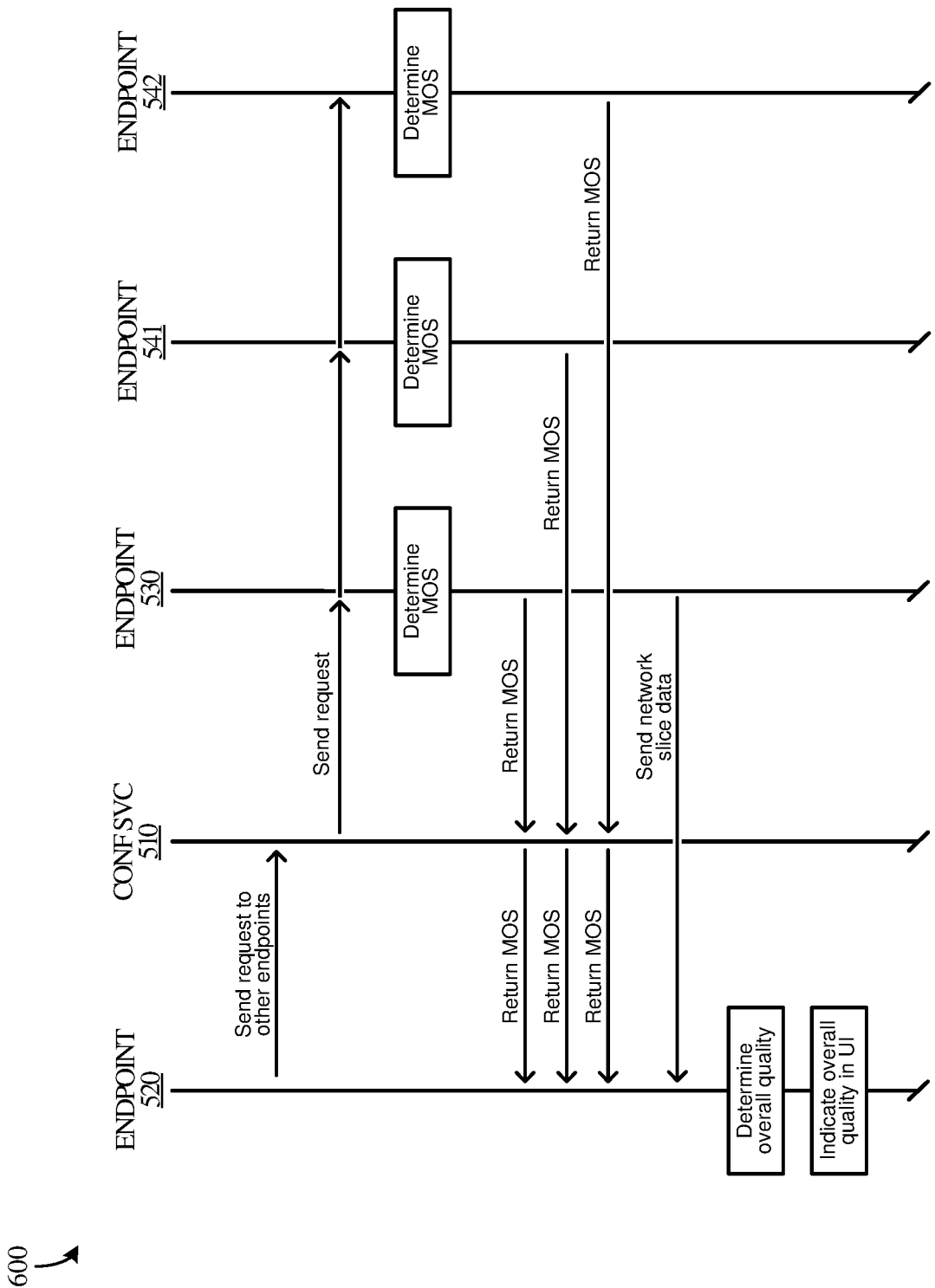
FIG. 6 illustrates an operational scenario for a conference call hosted by conferencing service in an implementation.

FIG. 6 illustrates operational scenario 600 representative of various processes, such as process 200, associated with testing communication quality from an endpoint during a conference call in an implementation, referring to the elements of operational architecture 500 in FIG. 5.

In operational scenario 600, endpoints 520, 530, 541, and 542 are connected to and exchange audio and video communication data in a conference call hosted by conferencing service 510. Endpoint 520 initiates a test of communications originating from endpoint 520 by sending a request to endpoints 530, 541, and 542 via communication service 510. The request includes a sample of audio and video data from the conference call. Upon receiving the request from endpoint 520, each of endpoints 530, 541, and 542 determines mean opinion scores for the sample of audio and video data in the request and return the mean opinion scores to endpoint 520 via conferencing service 510. Endpoint 530 also sends to endpoint 520 network slice data relating to the 5G network connectivity of endpoint 530 to the conference call. Using the mean opinion scores from endpoints 530, 541, and 542, endpoint 520 determines an overall quality of communications originating from endpoint 520. In an implementation, endpoint 520 computes an average of the mean opinion scores for the audio component of the sample and the video component of the sample. Based on the computed average, endpoint 520 determines the overall quality and displays and indication of the overall quality in a user interface of endpoint 520.

Turning now to FIG. 7, UE 700 is representative of a computing device which includes Wifi radio 750, 5GNR radio 760, and processing circuitry 770, which communicate with each other using transceivers 751, 761, and 772.

Wifi radio 750 of UE 700 includes hardware and software components by which UE 700 communicates with Wifi access node 791. Wifi radio 750 receives signals from Wifi access node 791 using antennas 757. From antennas 757, the signals are transmitted to amplifiers 756, then to modulation component 755, to analog-to-digital (A/D) convertor 754. From A/D convertor 754, the digitized signal is transmitted to digital signal processor (DSP) 753 which is operatively connected to memory 752 and transceiver 751. Transceiver 751 is also in communication with 5GNR radio 760 via transceiver 661 and processing circuitry 770 via transceiver 772.

5GNR radio 760 of UE 700 includes hardware and software components by which UE 700 communicates with 5GNR access node 792. 5GNR radio 760 receives signals from 5GNR access node 792 using antennas 768. From antennas 768, the signals are transmitted to amplifiers 767, to modulation element 765, and to A/D convertor 764. From A/D convertor 764, the digitized signals are transmitted to digital signal processor 763 which is operatively coupled to memory 762 and transceiver 761. Transceiver 761 communicates with transceiver 751 of Wifi radio 750 and transceiver 772 of processing circuitry 770.

Processing circuitry 770 of UE 700 includes central processing unit (CPU) 771, transceivers 772 and 773, and memory 780. CPU 771 may include one or more general processing units (GPUs). Memory 780 stores software or program instructions for performing the methods and processes described herein, including Wifi application software 781, 3GPP ($3^{rd}$ Generation Partnership Project) application software 782, operating system (OS) software 783, 5GNR application software 784, IP application software 785, and user application software 786 for gaming applications, virtual reality applications, and so on, and quality process software 787 for performing the various processes of the technology disclosed herein.

Figure 8:
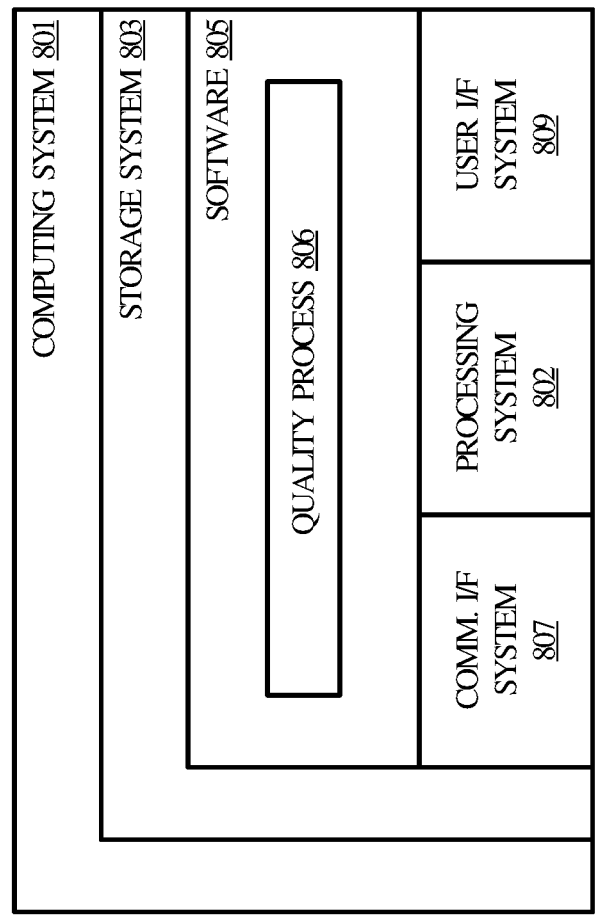
FIG. 8 illustrates a computing system suitable for implementing the various operational environments, architectures, processes, scenarios, and sequences discussed below with respect to the other Figures.

Turning now to FIG. 8, architecture 800 illustrates computing device 801 that is representative of any system or collection of systems in which the various processes, programs, services, and scenarios disclosed herein may be implemented. Examples of computing device 801 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements quality process 806, which is representative of the quality processes discussed with respect to the preceding Figures, such as process 200. When executed by processing system 802, software 805 directs processing system 802 to operate as described herein for at least the various processes, operational scenarios, and sequences discussed in the foregoing implementations. Computing device 801 may optionally include additional devices, features, or function not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including quality process 806) may be implemented in program instructions and among other functions may when executed by processing system 802, direct processing system 802 to operate as described with respect to the various operational scenarios, sequences, and processes illustrated herein. For example, software 805 may include program instructions for implementing the quality processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may when loaded into processing system 802 and executed, transform a suitable apparatus, system, or device (of which computing device 801 is representative) overall from a general-purpose computing system into a special-purpose computing system customized to support sensor device deployments and swaps. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary, etc.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The wireless data network circuitry described above comprises computer hardware and software that form special-purpose wireless system circuitry to serve wireless user devices based on policies. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless system circuitry to serve wireless user devices based on policies.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

Examples of the technology disclosed herein are provided below. A computing apparatus comprising one or more computer-readable storage media, one or more processors operatively coupled with the one or more computer-readable storage media, and program instructions stored on the one or more computer-readable storage media that, when executed by the one or more processors, direct the computing apparatus to perform the following steps. The computing apparatus sends a request from an endpoint to other endpoints associated with a conference call to test a quality of communications originating from the endpoint. The computing apparatus receives replies to the request, wherein each of the replies indicates a mean opinion score determined by a respective one of the other endpoints in response to the request. The computing apparatus determines an overall quality of the communications originating from the endpoint based on mean opinion scores received in reply to the request. The computing apparatus displays an indication of the overall quality of the communications originating from the endpoint in a user interface of the endpoint.

In an implementation, the computing apparatus determines the overall quality of the communications by determining an average of the mean opinion scores.

In an implementation, the computing apparatus determines the average of the mean opinion scores by excluding one of the mean opinion scores from the average based on empirical data.

In an implementation, the empirical data comprises network slice data of one of the other endpoints.

In an implementation, the computing apparatus sends the request from the endpoint to the other endpoints by sending at least one of audio data and video data.

In an implementation, the audio data and the video data comprise communication data from the conference call.

In an implementation, the computing apparatus further receives user input indicative of a request to initiate a test of the quality of communications originating, and in response to receiving the user input, sends the request from the endpoint to the other endpoints to test the quality of communications originating from the endpoint.

In an implementation, the computing apparatus sends the request from the endpoint to the other endpoints by sending the request from the endpoint to the other endpoints prior to the start of the conference call.

In an implementation, a conferencing service hosting a conference call gathers mean opinion scores from endpoints associated with the conference call, wherein the mean opinion scores are determined in response to a request from an endpoint of the endpoints to others of the endpoints to test a quality of communications originating from the endpoint. The conferencing service determines an overall quality of communications originating from the endpoint based at least on the mean opinion scores. The conferencing service sends to the endpoint an indication of the overall quality of communications originating from the endpoint.

In an implementation, the conferencing service determines the overall quality of communications originating from the endpoint by determining an average of the mean opinion scores.

In an implementation, the conferencing service determines the average of the mean opinion scores by excluding a mean opinion score of one of the others of the endpoints based on network slice data of the one of the others of the endpoints.

In an implementation, the conference service further causes the endpoint to display the indication of the overall quality of communication in a user interface at the endpoint.

In an implementation, the request comprises at least one of audio data and video data.

What is claimed is:

1. A method, comprising:
    sending, by a computing device, a request to endpoints associated with a conference call between the computing device and the endpoints to test a quality of communications originating from the computing device;
    receiving, by the computing device, replies to the request, wherein each of the replies indicates a mean opinion score determined by a respective one of the endpoints in response to the request;

excluding, by the computing device, one of the mean opinion scores from being averaged based on empirical data;

determining, by the computing device, an average of remaining mean opinion scores of the mean opinion scores;

determining, by the computing device, an overall quality of the communications originating from the computing device based on the average; and displaying, by the computing device, an indication of the overall quality of the communications originating from the computing device in a user interface of the computing device.

2. The method of claim 1, wherein the empirical data indicates the one of the mean opinion scores comprises an outlier.

3. The method of claim 1, wherein the empirical data indicates a connectivity issue for one of the endpoints that determined the one of the mean opinion scores.

4. The method of claim 1, wherein the empirical data comprises network slice data of one of the endpoints that determined the one of the mean opinion scores excluded from the average.

5. The method of claim 1, wherein sending, by the computing device, the request to the endpoints comprises sending, by the computing device, at least one of audio data and video data to the endpoints.

6. The method of claim 5, wherein the at least one of the audio data and the video data comprise communication data from the conference call.

7. The method of claim 1, further comprising:
receiving, by the computing device, a user input indicative of a request to initiate a test of the quality of the communications originating from the computing device; and wherein:
sending, by the computing device, the request to the endpoints to test the quality of the communications originating from the computing device comprises sending, by the computing device, the request to the endpoints to test the quality of the communications originating from the computing device in response to receiving the user input.

8. The method of claim 1, wherein sending, by the computing device, the request to the endpoints comprises sending, by the computing device, the request to the endpoints prior to the start of the conference call.

9. A computing apparatus comprising:
one or more computer-readable storage media;
one or more processors operatively coupled with the one or more computer-readable storage media; and
program instructions stored on the one or more computer-readable storage media that, when executed by the one or more processors, direct the computing apparatus to at least:
send a request from an endpoint to other endpoints associated with a conference call to test a quality of communications originating from the endpoint;
receive replies to the request, wherein each of the replies indicates a mean opinion score determined by a respective one of the other endpoints in response to the request;
exclude one of the mean opinion scores from being averaged based on empirical data;
determine an average of remaining mean opinion scores of the mean opinion scores;
determine an overall quality of the communications originating from the endpoint based on the average; and
display an indication of the overall quality of the communications originating from the endpoint in a user interface of the endpoint.

10. The computing apparatus of claim 9, wherein the empirical data indicates the one of the mean opinion scores comprises an outlier.

11. The computing apparatus of claim 9, wherein the empirical data indicates a connectivity issue for one of the other endpoints that determined the one of the mean opinion scores.

12. The computing apparatus of claim 9, wherein the empirical data comprises network slice data of one of the other endpoints.

13. The computing apparatus of claim 9, wherein to send the request from the endpoint to the other endpoints, the program instructions direct the computing apparatus to send at least one of audio data and video data.

14. The computing apparatus of claim 13, wherein the at least one of the audio data and the video data comprise communication data from the conference call.

15. The computing apparatus of claim 9, wherein to send the request from the endpoint to the other endpoints, the program instructions direct the computing apparatus to send the request from the endpoint to the other endpoints prior to the start of the conference call.

16. One or more computer-readable storage media having program instructions stored thereon that, when executed by one or more processors operatively coupled with the one or more computer-readable storage media, direct a computing device to:
send a request from an endpoint to other endpoints associated with a conference call to test a quality of communications originating from the endpoint;
receive replies to the request, wherein each of the replies indicates a mean opinion score determined by a respective one of the other endpoints in response to the request;
exclude one of the mean opinion scores from being averaged based on empirical data;
determine an average of remaining mean opinion scores of the mean opinion scores;
determine an overall quality of the communications originating from the endpoint based on the average; and
display an indication of the overall quality of the communications originating from the endpoint in a user interface of the endpoint.

17. The one or more computer-readable storage media of claim 16, wherein the empirical data indicates the one of the mean opinion scores comprises an outlier.

18. The one or more computer-readable storage media of claim 16, wherein the empirical data indicates a connectivity issue for one of the other endpoints that determined the one of the mean opinion scores.

19. The one or more computer-readable storage media of claim 16, wherein the empirical data comprises network slice data of one of the other endpoints.

20. The one or more computer-readable storage media of claim 16, wherein to send the request from the endpoint to the other endpoints, the program instructions direct the computing apparatus to send at least one of audio data and video data.

* * * * *